Dec. 11, 1928.

R. ST. CLAIR 1,694,894

LAWN TRIMMER

Filed Sept. 2, 1926

Inventor
Reuben St. Clair
By
Attorneys

Patented Dec. 11, 1928.

1,694,894

UNITED STATES PATENT OFFICE.

REUBEN ST. CLAIR, OF MILWAUKEE, WISCONSIN.

LAWN TRIMMER.

Application filed September 2, 1926. Serial No. 133,227.

This invention relates to lawn trimmers.

In cutting lawns, it is the usual practice to use an ordinary type of lawn mower which as is well known can not get into close places or near walls or trees, nor under the edge of shrubbery. It, therefore, is necessary in the old practice to trim by hand with ordinary shears, kneeling down upon the ground and working into these close places.

This invention is designed to overcome the defects noted above, and objects of this invention are to provide a novel form of lawn trimmer which may be very easily operated while the operator is in a standing position, and which will trim close to walls or trees, under shrubbery, and in other heretofore inaccessible positions.

Further objects of this invention are to provide a device which will not rock laterally, but which may be easily pushed along the ground to the desired point and which will hold the trimming shears at the requisite distance from the ground so that an absolutely even cut is secured.

An embodiment of the invention is shown in the accompanying drawings in which:—

Figure 1:
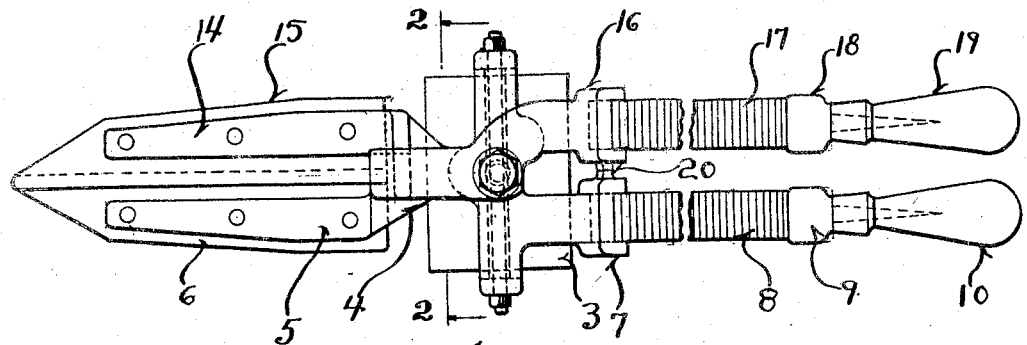
Figure 1 is a plan view of the device.
Figure 2:
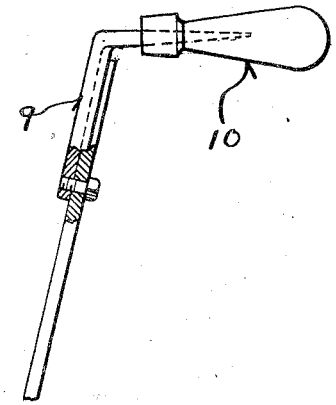
Figure 2 is a sectional view on the line 2—2 of Figure 1.
Figure 2:
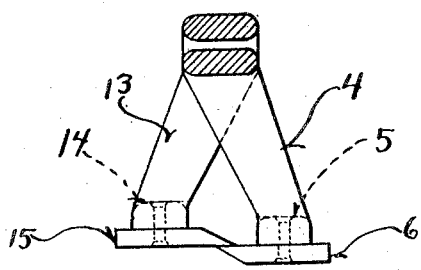
Figure 3:
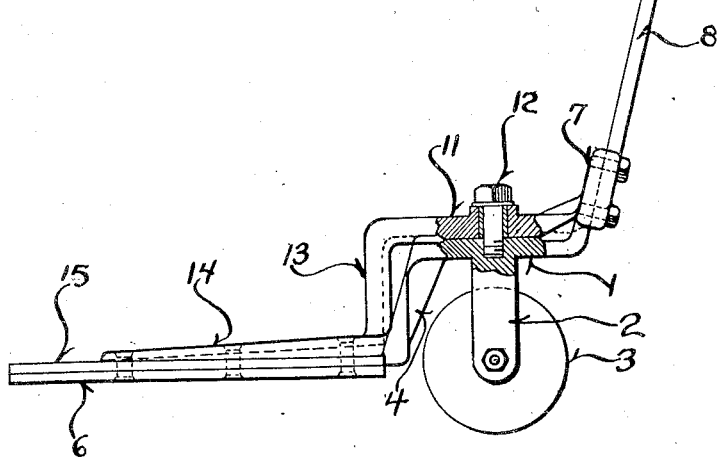
Figure 3 is a side elevation of the structure shown in Figure 1, such view being partly in section.

Referring to the drawings it will be seen that the device comprises a body portion 1 which is equipped with two downwardly extending lugs 2 between which an elongated roller 3 is mounted. This roller supports the body portion and insures the proper gauging of the length of cut. The body portion 1 has a forwardly and downwardly extending arm 4 which after reaching approximately the horizontal diameter of the roller, extends forwardly, as indicated at 5. This arm carries one of the shear blades 6. Further, it is to be noted from Figures 1 and 3, that the body portion 1 is provided with an upwardly and rearwardly slanting member 7 which receives the elongated rod or handle 8. This rod extends upwardly and has riveted thereto the channel shaped downturned portion 9 of an operating handle 10.

Upon the upper side of the body portion 1, the movable member 11 is pivotally positioned by means of the bolt 12. Preferably, the member 11 is bushed and extends forwardly and downwardly, as indicated at 13. This downwardly extending arm terminates in a horizontally extending arm 14 to which the other shear blade 15 is secured, as by means of rivets, for instance. The member 11 is provided with an upwardly and rearwardly slanting channel member 16 which receives the other upwardly extending rod or handle 17. This rod carries at its upper end the attaching portion 18 of the second operating handle 19.

If desired, the members 7 and 16 may be provided with projecting lugs 20 which contact when the blades are closed, and thus limit the inward motion of the blades.

In using the device, it is merely necessary for the operator to push the apparatus along, such apparatus being supported by the roller 3 and prevented from lateral tilting. He then operates the handles 10 and 19 and causes the opening and shutting of the shear blades, thus accurately trimming the grass, although the operator stands in an upright position.

It will be readily seen that he may push the shear blades into almost any position closely adjacent trees, walls, or under shrubbery, where it has heretofore been impossible to properly and easily trim the grass.

Although the invention has been described in considerable detail, such description is intended as illustrative rather than limiting as the invention may be variously embodied and as the scope of such invention is to be determined as claimed.

I claim:

A lawn trimmer comprising a body portion provided with a horizontal elongated laterally extending roller, an upwardly and rearwardly extending arm rigid with said body portion, a shear blade rigid with said body portion and carried in front of said roller, a member pivoted to said body portion at a point directly over the center of said roller, a second shear blade cooperating with said first mentioned shear blade and rigid with said member and an upwardly and rearwardly extending arm rigid with said member, each of said upwardly and rearwardly extending arms having horizontal rearwardly directed handles rigid therewith and located at their upper ends, whereby said rearwardly directed handles control the direction of motion of translation of the device and whereby relative motion between said handles causes relative motion between said shear blades.

In testimony that I claim the foregoing I have hereunto set my hand at Milwaukee, in the county of Milwaukee and State of Wisconsin.

REUBEN ST. CLAIR.